United States Patent [19]
Ikarashi et al.

[11] Patent Number: 5,115,329
[45] Date of Patent: May 19, 1992

[54] ELECTROLUMINESCENT DEVICE HAVING A LIQUID CRYSTAL LAYER ADJACENT TO THE ELECTROLUMINESCENT LAYER WITHOUT ANY ELECTRODE PLACED THEREBETWEEN

[75] Inventors: Masami Ikarashi; Kenichi Mitsumori; Mitsuru Kano; Yasuhiro Miki; Takemi Akimoto; Masahiko Yamaguchi, all of Furukawa; Yorihiko Sasaki, Toda; Tomoo Kamigaki, Furukawa; Jun Nakanowatari, Toda; Yoshinori Kato, Furukawa; Hitoshi Seki, Sendai, all of Japan

[73] Assignee: Alps Electric Co., Ltd., Tokyo, Japan

[21] Appl. No.: 530,134

[22] Filed: May 29, 1990

[30] Foreign Application Priority Data

Aug. 17, 1989 [JP] Japan .................. 1-211687

[51] Int. Cl.⁵ .................. G02F 1/13; H05B 33/00
[52] U.S. Cl. .................. 359/50; 359/98; 313/506
[58] Field of Search .................. 350/334, 331 R, 345, 350/350 F; 340/760, 781; 313/502, 509, 506

[56] References Cited

U.S. PATENT DOCUMENTS

| 3,775,631 | 11/1973 | Morikawa | 313/502 |
| 4,097,776 | 6/1978 | Allikinov | 350/350 F |
| 4,882,517 | 11/1989 | Maruyama et al. | 350/345 |

FOREIGN PATENT DOCUMENTS

| 2263446 | 7/1974 | Fed. Rep. of Germany | 350/345 |
| 3031126 | 4/1982 | Fed. Rep. of Germany | 350/341 |
| 0133460 | 11/1978 | Japan | 350/350 F |
| 0221828 | 12/1983 | Japan | 350/345 |
| 0094740 | 5/1984 | Japan | 350/350 F |

*Primary Examiner*—Stanley D. Miller
*Assistant Examiner*—Tai V. Duong
*Attorney, Agent, or Firm*—Guy W. Shoup; David W. Heid

[57] ABSTRACT

A electroluminescence device has a light emitting layer composed of a fluorescent powder and a liquid crystal between a transparent substrate formed with a transparent electrode and an insulating substrate formed with an opposed electrode.

1 Claim, 3 Drawing Sheets

5,115,329

ELECTROLUMINESCENT DEVICE HAVING A LIQUID CRYSTAL LAYER ADJACENT TO THE ELECTROLUMINESCENT LAYER WITHOUT ANY ELECTRODE PLACED THEREBETWEEN

BACKGROUND OF THE INVENTION

1. Field of the Invention

This invention relates to an electroluminescence device (hereinafter merely referred to as EL device) utilizing an electroluminescence phenomenon (hereinafter merely referred to as EL phenomenon).

2. Description of the Prior Art

The EL phenomenon is the phenomenon in which an electric field is applied to a sort of fluorescent substance to obtain a light emission. Since the EL device utilizing the EL phenomenon is light weight and thin, it has been heretofore generally used as a back light such as a liquid crystal display device.

FIG. 5 shows one example of an EL device of an organic dispersed type wherein a fluorescent powder 5 is dispersed into a resin 6 to form a light emitting layer 3, to which is applied an AC electric field to emit light.

The EL device of the organic dispersed type has a transparent electrode 2 formed of indium tin oxide (ITO), a light emitting layer 3 and an opposed electrode 4 formed of aluminum or the like, which are stacked in that order on one surface of a transparent substrate 1 formed of glass or the like. The light emitting layer 3 is formed by dispersing fluorescent powders 5 wherein active agents such as Cu, Mn, TbF$_3$, SmF$_3$, etc. are suitably added into a base material such as a mixed crystal of ZnS or ZnS and ZnSe according to an emitting color to form a center of light emission, into a resin 6 such as fluoroplastics, polyvinyl alcohol (PVA), polycarbonate (PC).

An AC electric field of 50 Hz–10 kHz in the order of $10^4$ V/cm, for example, is applied between the transparent electrode 2 and the opposed electrode 4 to emit light.

The electric field/luminance characteristics in 400 Hz of the EL device structured as described above is shown in FIG. 6.

In the EL device as described above, in a case where a matrix display takes place, it is necessary that a multiplex drive is effected between an electric field $E_1$ (hereinafter merely referred to electric field $E_1$) of a selective segment and an electric field $E_2$ (hereinafter merely referred to as an electric field $E_2$) of a non-selective segment to increase a contrast $B_1 : B_2$ between a luminance $B_1$ in the electric field $E_1$ and a luminance $B_2$ in the electric field $E_2$. (See FIG. 6.)

However, in the electric field/luminance characteristics of the EL device as constructed above, the degree of curve of the luminance to the applied electric field is small for each frequency, and therefore, there was an inconvenience in that a contrast sufficient to obtain a clear matrix display is not obtained due to the light emitted by a cross talk produced in the non-selective segment.

SUMMARY OF THE INVENTION

This invention has been achieved to solve the aforementioned problem. It is an object of this invention to provide an EL device which is less in occurrence of the cross talk and is large in contrast between the selective segment and the non-selective segment in case of the multiplex drive.

According to the EL device of this invention, a light emitting layer composed of fluorescent powder and a liquid crystal is provided between a transparent substrate formed with a transparent electrode and an insulating substrate formed with an opposed electrode.

In the EL device of this invention, a light emitting layer composed of fluorescent powder and a liquid crystal is provided between a transparent substrate formed with a transparent electrode and an insulating electrode formed with an opposed electrode, and a sharp curve is imparted to the electric field/luminance characteristics of the EL device according to a change in sharp transmittance indicated by the liquid crystal in the light emitting layer depending on the electric field to be applied to improve the display contrast.

DETAILED DESCRIPTION OF THE INVENTION

The present invention will be described in detail.

Figure 1:
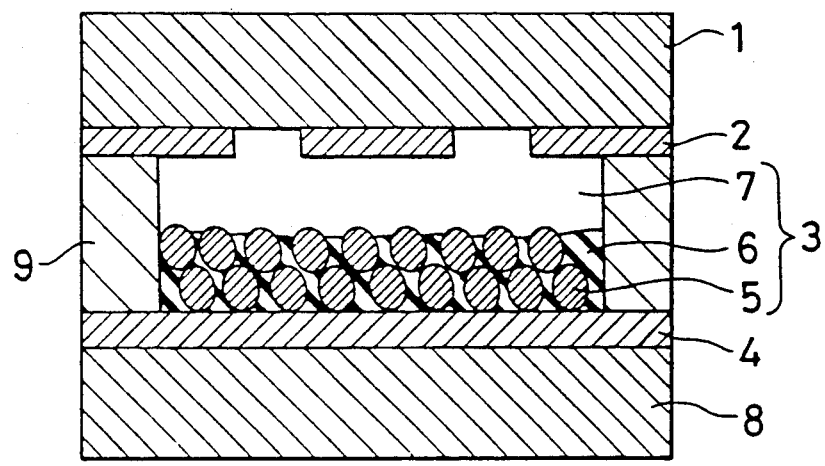
FIG. 1 is a schematic illustration of one example of an EL device according to this invention.
Figure 5:
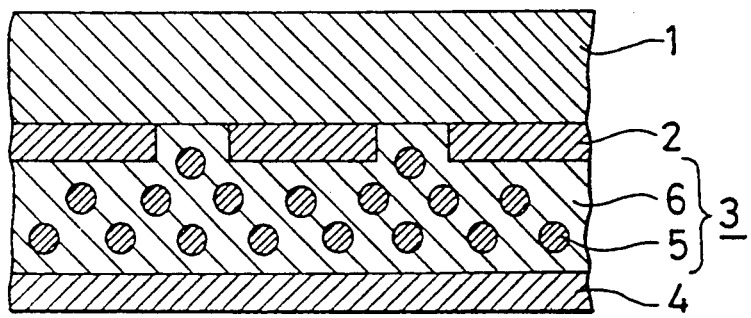
FIG. 5 is a schematic illustration of a conventional EL device of an organic dispersed type.
Figure 6:
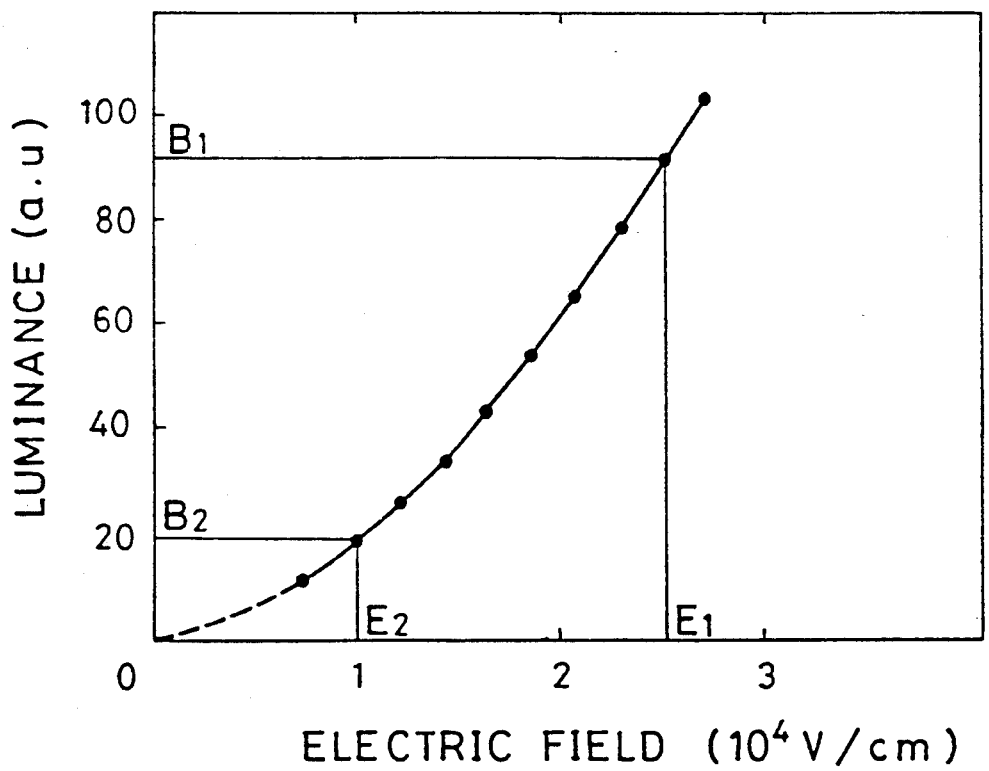
FIG. 6 is a graph showing the electric field/luminance characteristics of the EL device of the organic dispersed type shown in FIG. 5.

FIG. 1 shows one example of an EL device according to this invention. The EL device shown in FIG. 1 is different from the EL device of the organic dispersed type shown in FIG. 5 in that a light emitting layer 3 composed of fluorescent powders 5 and a liquid crystal 7 is sealed between a transparent substrate 1 formed with a transparent electrode 2 by an adhesive 9 and an insulating substrate 8 formed with an opposed electrode 4.

Figure 2:
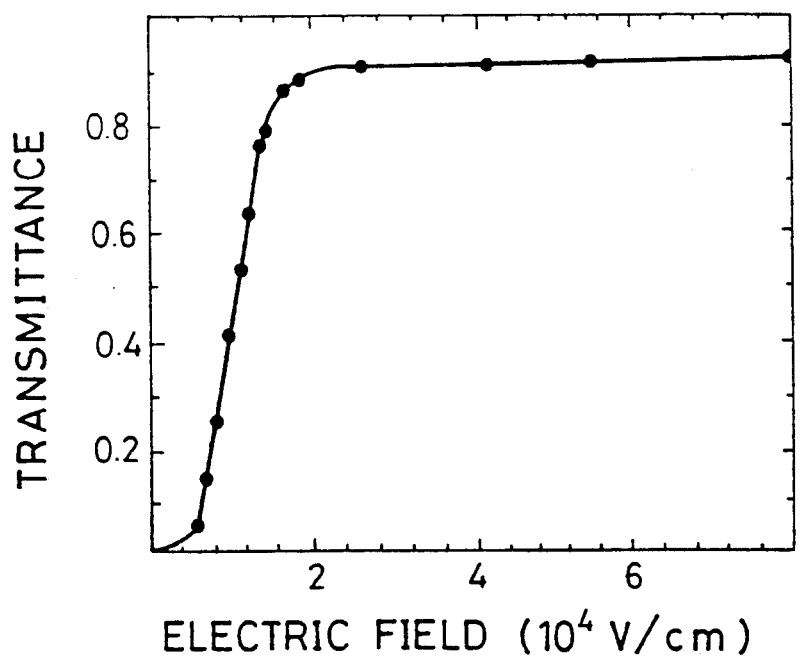
FIG. 2 is a graph showing the electric field/transmittance characteristics of a liquid crystal of the EL device shown in FIG. 1.

The liquid crystal 7 in the light emitting layer 3 utilizes a change of a sharp transmittance indicated by the liquid crystal according to the applied electric field to impart a sharp curve to the electric field/luminance characteristics of the EL device. The liquid crystal 7 greatly varies the transmittance according to the magnitude of the electric field applied, for example, showing the characteristics as shown in FIG. 2. In FIG. 2, the axis of abscissa indicates the magnitude of the electric field applied to the liquid crystal 7, and the axis of ordinate indicates the transmittance of the liquid crystal 7.

In the liquid crystal 7, the transmittance sharply varies in the applied electric field between $0$–$2 \times 10^4$ V/cm. Therefore, a sharp curve can be imparted to the electric field/luminance characteristics of the EL device in order to shield light emitted by the cross talk to make a contrast higher.

Therefore, according to the EL device of the present invention, the luminance is sharply varied when the electric field is applied. Therefore, light emitted by the cross talk can be shielded, and even if the duty drive whose a difference of electric field between $E_1$ and $E_2$ is small is effected, light emission having a sufficient contrast can be obtained. As a result, it is possible to realize an EL device of an organic dispersed type of the segment or dot matrix drive.

The EL device as constructed above can be produced by the following procedure, for example.

First, a transparent substrate 1 formed of glass or polymer film and an insulating substrate 8 are prepared, and a transparent electrode 2 formed of ITO or the like is formed on the transparent substrate 1. This transparent electrode 2 is formed by vapor deposition or sputtering. This patterning may be carried out by masking or etching after deposition. Preferably, this transparent electrode 2 is a sheet resistor less than 1 K ohm/cm$^2$. An opposed electrode 4 less than 1 K ohm/cm$^2$ in sheet resistance is formed on the insulating substrate 8. This opposed electrode 4 may be formed of metal such as aluminum or metal oxide having a conductivity such as ITO, and can be formed by coating by vacuum deposition or coating with a conductive paste obtained by dispersing metal powder such as Al into an organic resin.

Figure 3:
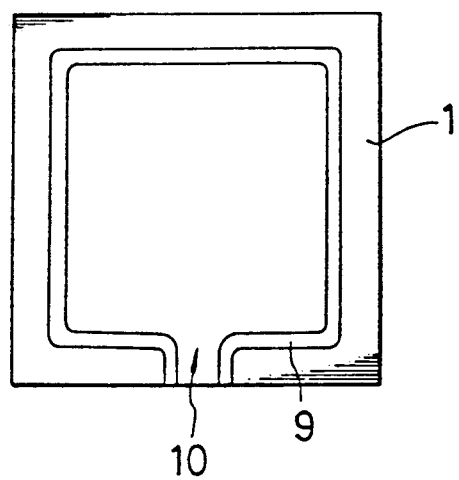
FIG. 3 is a plan view showing an adhesion pattern of an adhesive when the EL device of this invention is produced.

Next, a light emitting layer 3 composed of fluorescent powders 5 and a liquid crystal 7 is formed on the opposed electrode 4. The light emitting layer 3 is formed by coating a solution obtained by dispersing the fluorescent powders 5 into a diluted solution of the resin 6 formed of fluorine resin or the like by thick-film forming means such as screen printing or blade process, heating and drying a solvent into a film in thickness of 10 to 80 μm, arranging the transparent substrate 1 and the insulating substrate 8 so that the transparent electrode 2 and the opposed electrode 4 are opposed to each other, and adhering an open liquid crystal pouring port 10 to a part of a peripheral portion of the transparent substrate 1 as shown in FIG. 3 by an adhesive 9 formed of epoxy resin or the like to prepare a cell.

Then, the liquid crystal 7 is poured into the cell from the liquid crystal pouring port 10, after which the liquid crystal pouring port 10 is adhered and sealed by an adhesive formed of epoxy resin or the like to form the light emitting layer 3.

The adhesive 9 may be one into which is mixed a spacer formed of transparent glass beads or the like. The fluorescent powders 5 or transparent glass beads or the like may be interposed as a spacer between a layer formed from the resin 6 and the fluorescent powders 5 and the transparent electrode 1.

As the liquid crystal 7, there can be used a twisted nematic liquid crystal, a smectic liquid crystal, a cholesteric liquid crystal or the like which are widely used for liquid crystal display device or the like, and in addition thereto, polymer liquid crystals of polysiloxane group may be used alone or in combination. When a dichroic dye which absorbs at least a light emitting color of the fluorescent powders 5 is added into the liquid crystal 7, the contrast can be further increased.

The fluorescent powders 5 used for the light emitting layer 3 are suitably selected according to displayed colors of the EL device but fluorescent powders normally used as EL device can be used. For example, active agents such as Cu, Mn, TbF$_3$, SmF$_3$, etc. are added to a base material such as a mixed crystal of ZnS or ZnS and ZnSe according to the light emitting color to form a luminescence center.

The transparent electrode 2 and the opposed electrode 4 are connected together by a lead wire, after which the whole device is sealed by means of a moisture-proof organic film or the like formed of fluorine contained polymer film to form an electric field light emitting device of this invention.

In the EL device of this invention, a dielectric layer may be provided between the transparent electrode 2 and the opposed electrode 4. For example, as the dielectric layer provided between the light emitting layer 3 and the opposed electrode 4, there is one in which a dielectric material is dispersed into the resin. As suitable dielectric materials, use may be made of SiO$_2$, Al$_2$O$_3$, Y$_2$O$_3$, Si$_3$N$_4$, BaTiO$_3$, Ta$_2$O$_5$, etc. By the provision of the dielectric layer, it is possible to prevent a dielectric break down of the fluorescent powders 5 when an electric field is applied to improve the stability of the EL device.

EXAMPLES

EXAMPLE 1

Two glass substrates were prepared. A transparent electrode of 10 ohm/cm$^2$ of sheet resistance having a predetermined pattern was formed on one surface of one substrate with ITO vapor deposited, while an Al thin film of 0.3 μm in thickness was coated on one surface of the other substrate to form an opposed electrode. Next, a fluorescent powder of 25 μm in average grain size of a ZnS : Cu group was added into a solution of PVA, after which it was sufficiently stirred and evenly coated on the opposed electrode by screen printing process. The product was dried for two hours at 100° C. to form a layer of approximately 30 μm. Then, these two glass substrates were arranged so that the transparent electrode and the opposed electrode were opposed. An open liquid crystal pouring port was adhered to a part of a peripheral portion of these substrates, which was heated for two hours at 120° C. to prepare a cell. After a liquid crystal (EM Chemicals : E7) has been poured into the cell vacuum pouring process, the liquid crystal pouring port was adhered and sealed by the epoxy resin to thereby form a light emitting layer. Then, the transparent electrode and the opposed electrode were connected by a lead wire, and the thus formed whole EL device was sealed by a moisture-proof fluorine contained polymer film to obtain an EL device of Example 1.

An AC electric field was applied to the EL device of Example 1 in the range of 0 to 3.0 × 10$^4$ V/cm with 400 Hz of frequency. The light emitting luminance was measured, then the electric field/luminance characteristic as shown in FIG. 4 was obtained.

Figure 4:
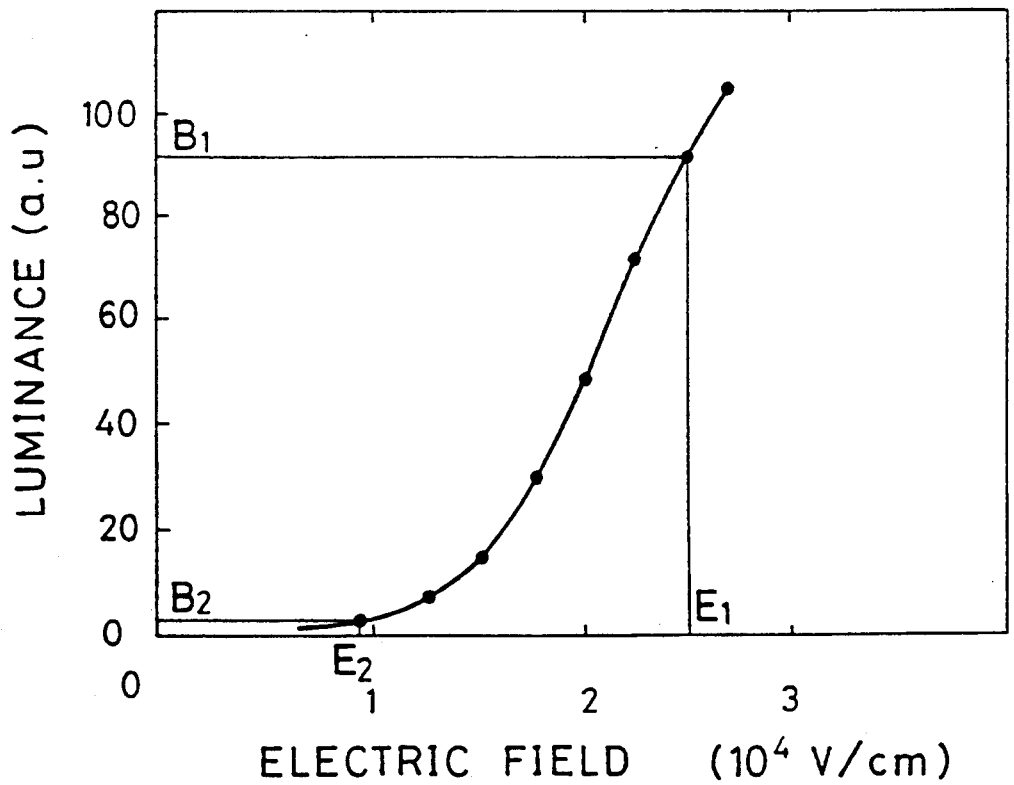
FIG. 4 is a graph showing the electric field/luminance characteristics of the EL device shown in FIG. 1.

As shown in FIG. 4, the selective state E was set to 2.5 × 10$^4$ V/cm an the non-selective state $E_2$ to 0.9 × 10$^4$ V/cm, between which the duty drive was effected. The light emission having the contrast of $B_1 : B_2 = 30:1$ was obtained, which was confirmed to be materially improved as compared with the contrast of 4.5:1 of the conventional EL light emitting device of the organic dispersed type.

EXAMPLE 2

An EL device was produced as Example 1 in exactly the same manner as that of Example except that as the liquid crystal of the EL device according to Example 1, a black dichroic dye obtained by mixing in the ratio of 1:1:1 of G-232 (made by Nippon Kanko Shikiso) which is a yellow dichroic dye, LSR-405 (made by Mitsubishi Kasei) which is a red dichroic dye and LMB-040 (made by Mitsubishi Kasei) which is a blue dichroic dye was added in an amount of 5 per cent by weight to the liquid crystal and evenly dispersed.

When the EL device of Example 2 was emitted under exactly the same conditions as those of Example 1, the contrast of 100:1 was obtained.

While in the present example, use was made of a construction of the light emitting layer in which the fluorescent powder is fixed to the resin, it is to be noted that the present invention is not limited thereto but for example, use may be made of a construction in which the fluorescent powder is filled between the transparent substrate and the insulating substrate.

Moreover, there has been shown a construction in which Al was used as the opposed electrode but this invention is not limited thereto. For example, as the insulating substrate, a transparent material may be used, and as the opposed electrode, a transparent electrode such as ITO may be used.

As described above, in the EL device of this invention, the light emitting layer composed of the fluorescent powder and the liquid crystal is provided between the transparent substrate formed with the transparent electrode and the transparent substrate formed with the opposed electrode. Therefore, it is possible to impart a sharp change in the luminance of the EL device due to a sharp change of the transmittance indicated by the liquid crystal in the light emitting layer when the electric field is applied. By shielding the light emitted by the cross talk, the display contrast can be increased, as a consequence of which it is possible to provide segment or dot matrix display which has been difficult in the conventional EL device of the organic dispersed type.

Moreover, in the EL device of this invention, a dichroic dye which absorbs a wavelength of light emitting color of the fluorescent powder can be added to the liquid crystal in the light emitting layer to thereby materially increase the contrast.

What is claimed is:

1. An electroluminescent device comprising:
   a transparent substrate having transparent electrodes thereon;
   an insulating substrate having an opposing electrode formed thereon; and
   a liquid crystal layer and an electroluminescent layer which are disposed between said transparent and insulating substrates, such that said liquid crystal layer is positioned adjacent to said transparent substrate and said liquid crystal layer and said electroluminescent layer are adjacent to each other without any electrode placed therebetween.

* * * * *